United States Patent

[11] 3,628,206

[72] Inventor John L. Mecham
    1193 E. 2nd North, Orem, Utah 84057
[21] Appl. No. 684,657
[22] Filed Nov. 21, 1967
[45] Patented Dec. 21, 1971

[54] COMBINATION COASTER AND RAFT
    1 Claim, No Drawings
[52] U.S. Cl. .................................................... 9/11,
                                                    9/1, 280/12
[51] Int. Cl. ...................................................... B63c 9/04
[50] Field of Search .............................................. 9/1, 1.5, 11,
                                  11.1, 2, 2 I; 280/18, 19, 12, 12 B

[56] References Cited
       UNITED STATES PATENTS
2,876,467  3/1959  Lund ............................  9/11 A 3,135,978  6/1964  Grasmoen .....................  9/1 A UX
3,225,367  12/1965  Gavlek ........................  9/1 A

*Primary Examiner*—Trygve M. Blix
*Attorney*—M. Ralph Shaffer

ABSTRACT: This device is composed of an inflated rubber innertube which forms the main body portion of the device and a bottom portion is secured to a toroidal-shaped canvas or neoprene covering which is laced together at the top area of the device, the base portion of the device being constructed of fiberglass or other suitable material with foam rubber secured to the top of it to form a comfortable seating area within the device. The device may be used as a coasting structure for riding on soft snow safely down slopes and it also serves as a raft when used upon water.

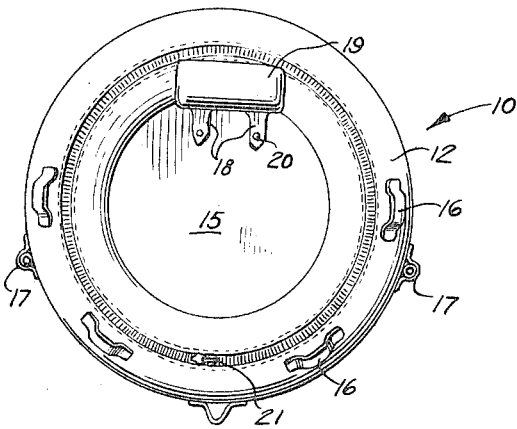

PATENTED DEC 21 1971　　　　　　　　　　　　　　3,628,206

CANVAS OR NEOPRENE
RUBBER INNER TUBE
FOAM RUBBER
FIBERGLASS

INVENTOR
JOHN L. MECHAM

COMBINATION COASTER AND RAFT

This invention relates to vehicles and, more particularly, to an inflatable coaster and raft combination.

It is therefore the main purpose of this invention to provide a combination coaster and raft which will have a smooth bottom portion which is secured to a covering, said covering being secured at the top area of the device.

Another object of this invention is to provide a combination coaster and raft which will have a cushion of foam rubber secured to the bottom on the interior of the device in order to impart maximum comfort to the rider who sits within the interior of the device.

A further object of this invention is to provide a combination coaster and raft which may be used to coast downward on winter slopes or may be used as a raft on the surface of water and will have hand hold grips extending from the exterior for carrying or holding onto the device.

Other objects of the present invention are to provide a combination coaster and raft which is simple in design, inexpensive to manufacture, rugged in construction, easy to use and efficient in operation.

These and other objects will become readily evident upon a study of the following specification together with the accompanying drawing wherein:

FIG. 3 is a side view of the invention shown in use upon water; and

Figure 1:
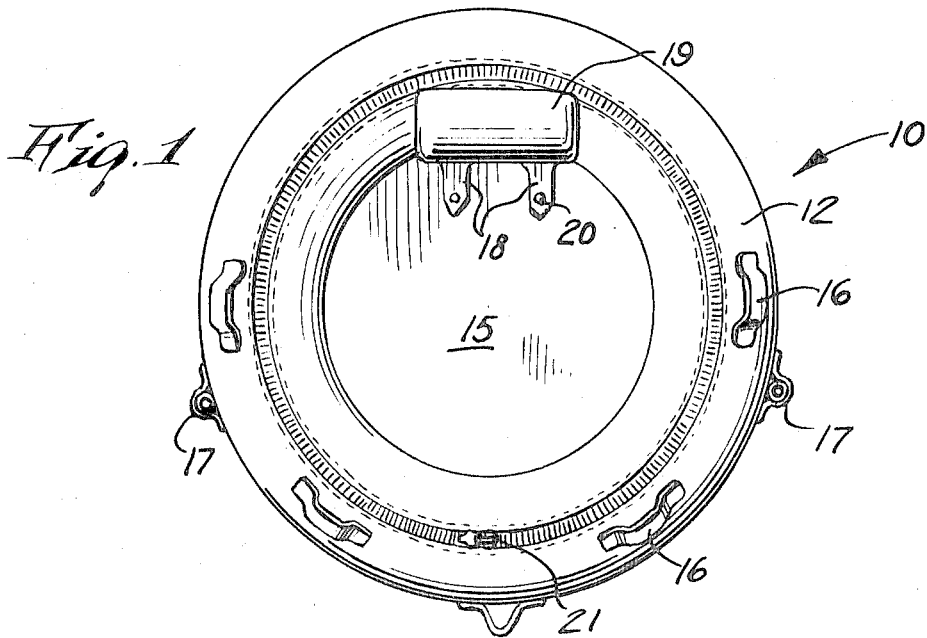
FIG. 1 is a top plan view of the present invention.
Figure 2:
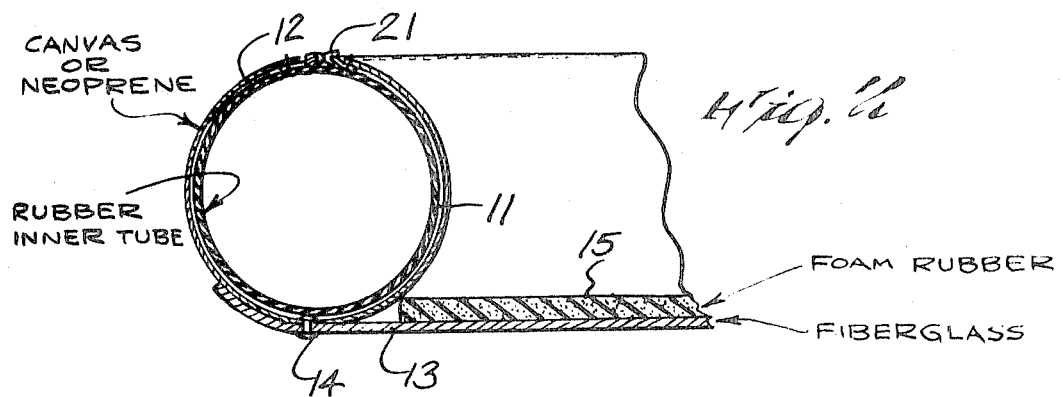
FIG. 2 is a fragmentary cross-sectional view of FIG. 1.
Figure 4:
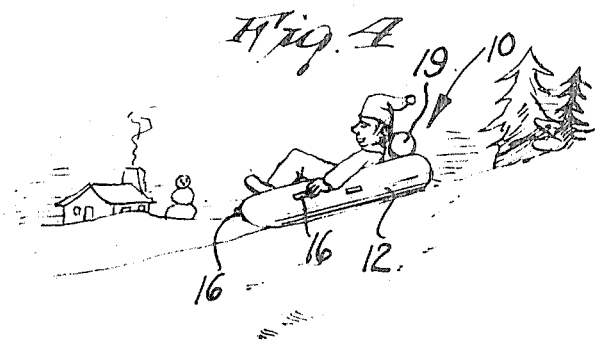
FIG. 4 is a side view of the invention shown in use on a winter slope.
Figure 5:

According to this invention, a combination coaster and raft 10 is provided with an inflated rubber innertube 11 around which is secured a flexible cover 12 of a canvas or other suitable material. A rigid fiberglass bottom member 13 is secured by rivet fasteners 14 or other suitable means to cover 12 and a foam rubber cushion 15 is secured to the top surface on the interior of combination coaster and raft 10. Bottom member 13 is turned upwardly at its outer edge, as shown. A plurality of spaced apart handles 16 are secured to cover 12 to allow for the carrying of the combination coaster and raft 10 or holding onto it when it is used as a coaster down a winter slope. A pair of oar locks 17 are secured also to cover 12 and serve to hold oars in the event combination coaster and raft 10 is used on water as is shown in FIG. 3 of the drawing. A pair of tongues 18 extending from a headrest 19 provides securement means through the use of fasteners 20 to the bottom of combination coaster and raft 10.

In use, a person sits on the interior of combination coaster and raft 10 and slides or coasts down a winter slope, the bottom member 13 being of sufficient hardness so to give a smooth gliding ride to the user.

It will be noted that cover 12 may be laced or a zipper 21 may be applied to close cover 12 around the inflated inner tube 11.

When the combination coaster and raft 10 is used upon the water, oar locks 17 are used to facilitate rowing the combination coaster and raft 10.

While various changes may be made in the detailed construction, it is understood that such changes will be within the spirit and scope of the present invention.

What I now claim is:

1. In a combination coaster-and-raft device, an innertube, a flexible, hollow, toroidal-shaped cover carried by said innertube, and a rigid bottom member secured to and under said cover for providing a running surface for said device on a slope and a bottom for said device, and wherein said rigid bottom member of said device is contoured upwardly at its outer periphery in order that said rigid bottom member will act as a runner without digging into a slope.

* * * * *